US006161135A

United States Patent [19]
Ehrlich et al.

[11] Patent Number: 6,161,135
[45] Date of Patent: *Dec. 12, 2000

[54] METHOD AND APPARATUS FOR SOFTWARE FEATURES SYNCHRONIZATION BETWEEN SOFTWARE SYSTEMS

[75] Inventors: Timothy S. Ehrlich, Telford; Timothy C. Sell, Honeybrook; Timothy D. Updegrove, Birdsboro, all of Pa.

[73] Assignee: Unisys Corporation, Blue Bell, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/813,744

[22] Filed: Mar. 7, 1997

[51] Int. Cl.[7] .............................. G06F 13/38; G06F 15/17
[52] U.S. Cl. ........................ 709/221; 713/100; 709/315; 717/11
[58] Field of Search ..................................... 709/300, 303, 709/302, 220, 221, 315; 395/712; 713/1, 100; 717/11

[56] References Cited

U.S. PATENT DOCUMENTS

| 4,875,159 | 10/1989 | Cary et al. ............................ | 364/200 |
| 5,421,009 | 5/1995 | Platt ....................................... | 395/712 |
| 5,706,431 | 1/1998 | Otto ....................................... | 709/221 |
| 5,752,042 | 5/1998 | Cole et al. ............................. | 395/712 |
| 5,805,897 | 9/1998 | Glowny .................................. | 709/221 |
| 6,009,274 | 12/1999 | Fletcher et al. ....................... | 713/100 |
| 6,029,196 | 1/2000 | Lenz ...................................... | 713/100 |
| 6,047,129 | 4/2000 | Frye ....................................... | 717/11 |

FOREIGN PATENT DOCUMENTS

WO 91/02313  2/1991  WIPO .

OTHER PUBLICATIONS

Lin, Yi–Jing, et al.; "Configuration Management with Logical Structures"; vol. 68, No. 10; Apr. 26, 1996; pp. 298–307.

IBM Technical Disclosure Bulletin, "Method to Reduce the Size or Number of fix Media for Periodic fix Updates"; vol. 37, No. 9; Sep. 1, 1994; p. 141.

*Primary Examiner*—Mark H. Rinehart
*Attorney, Agent, or Firm*—Albert B. Cooper; Mark T. Starr; Rocco L. Adornato

[57] ABSTRACT

A feature coordination interface between the Operating System (OS) and a Special Purpose Processor (SPP) in a computer system. Both the OS and SPP maintain a list of bit masks, identified by word numbers, where an associated bit is set in an associated bit mask if the OS or SPP supports a feature identified by the bit. During initialization, the OS transfers each of its bit masks to the SPP whereat features are compared. In response, the SPP sends each of its corresponding bit masks back to the OS together with an error indication if the OS does not support a feature required by the SPP. The OS compares its features with those of the SPP and enters an error shutdown process if the OS has received an error indication from the SPP or if the SPP does not support a feature required by the OS.

24 Claims, 8 Drawing Sheets

FIG. 2(a)
```
BOOLEAN  PROCEDURE
   TCU_EXCHANGE_FEATURES
   (WORDNUM, MCPTCUFEATURES,
   LASTCALL);
   NAME     WORDNUM, MCPTCUFEATURES,
            LASTCALL;
   INTEGER  WORDNUM;
   BOOLEAN  MCPTCUFEATURES, LASTCALL;
```
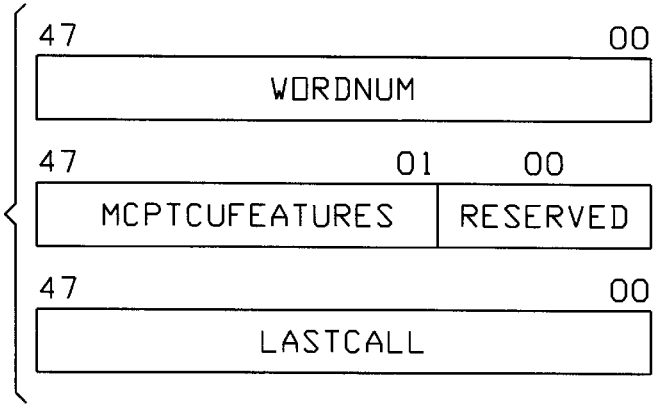
FIG. 2(b)
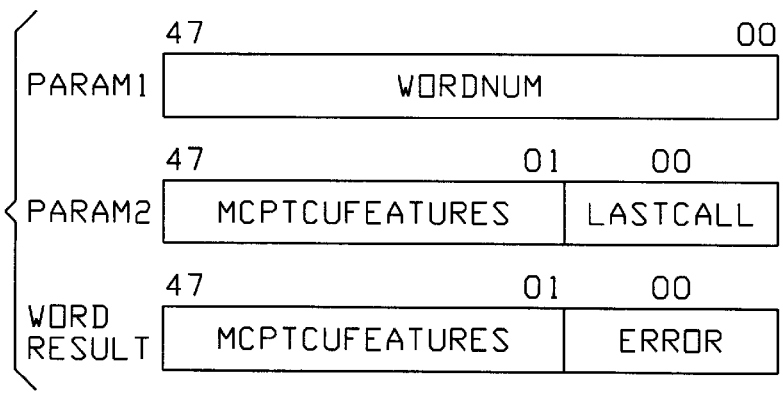
FIG. 2(c)

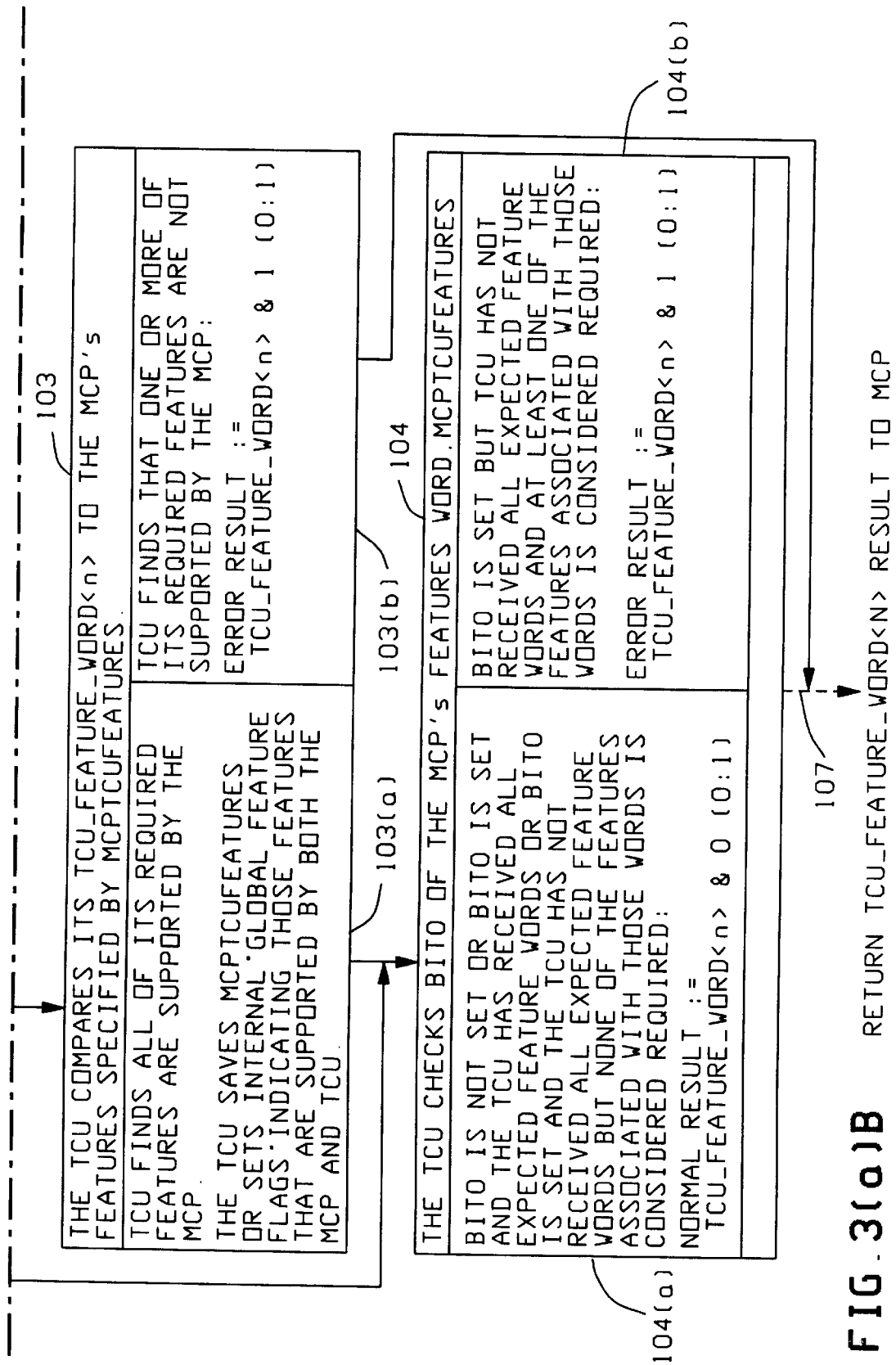
FIG. 3(a)B

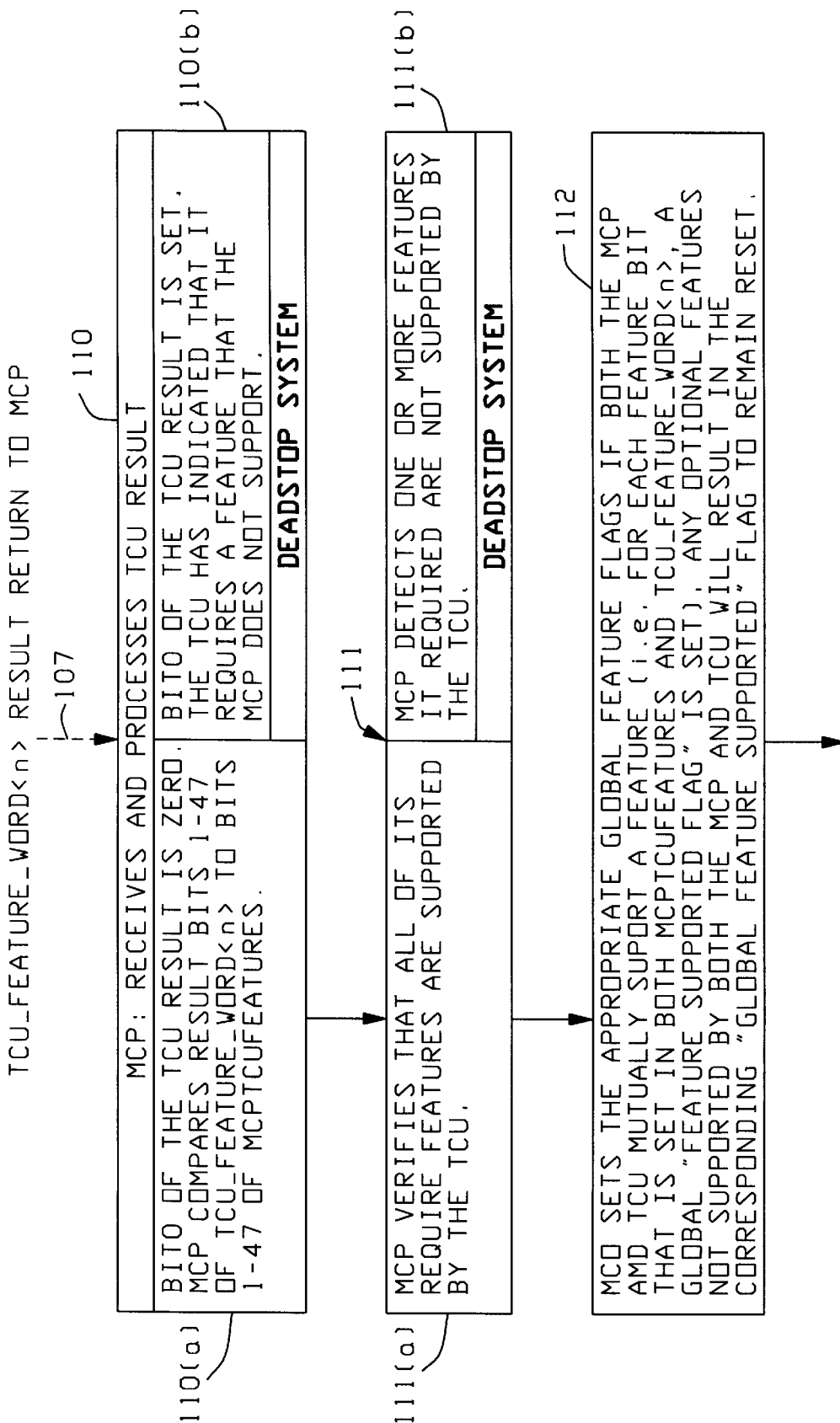

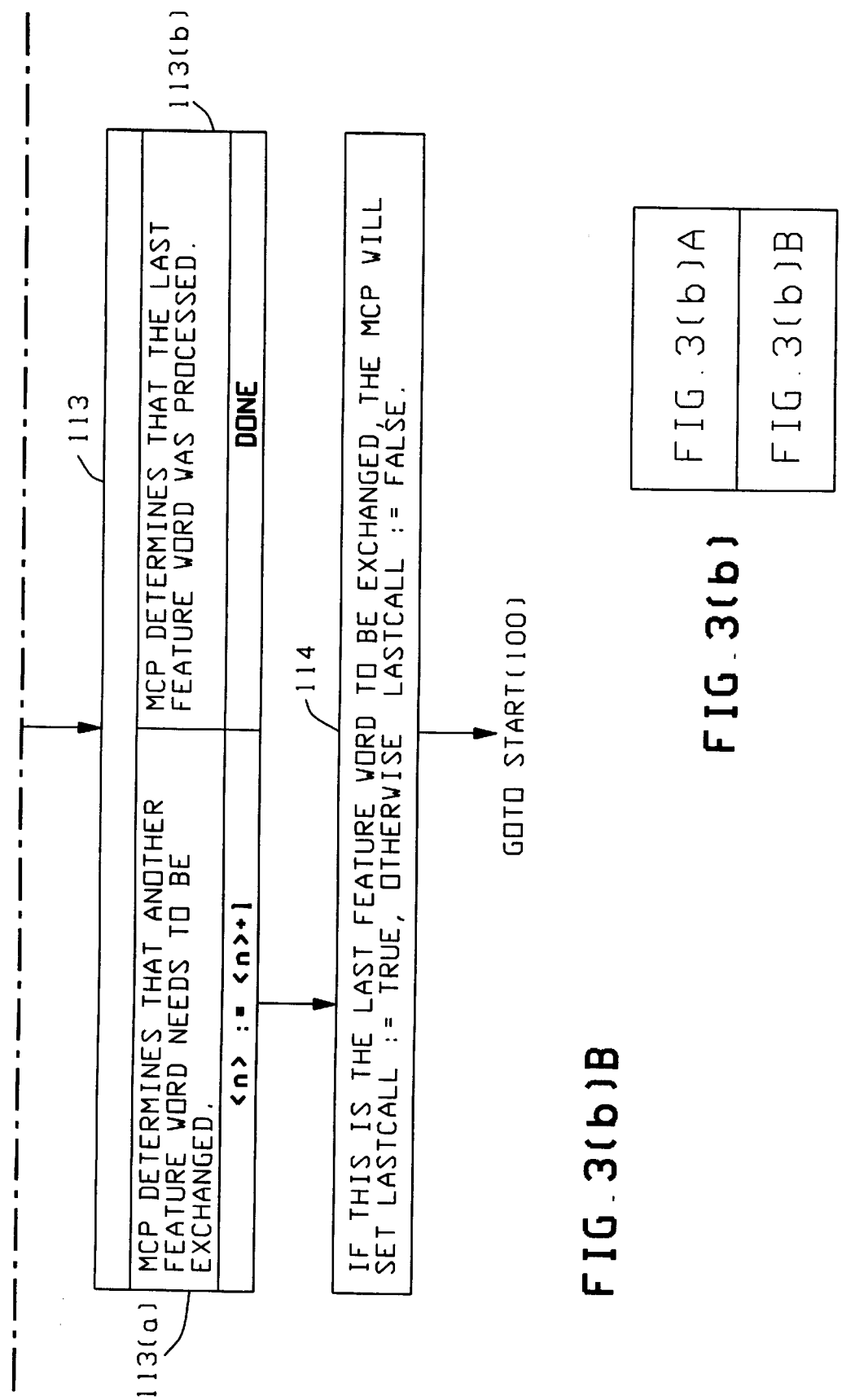

START: WORDNUM_OS := 1;

LOOP:
[OS] FEATUREWORD_OS := FEATURES_OS[WORDNUM_OS];   % FEATURES_OS: Array of feature word
                                                   % bit masks supported by OS. This
                                                   % is hardcoded data.

IF this is the last feature word THEN
    FEATUREWORD_OS := FEATUREWORD_OS & 1 [0:1];

[OS] SPPFEATURES_OS :=EXCHANGE_FEATURES (WORDNUM_OS, FEATUREWORD_OS);

[SPP] %Receives WORDNUM_OS and FEATUREWORD_OS from function call. Note that references
      % to these parameters use " < > "
IF <WORDNUM_OS> is not a recognized feature word THEN
    FEATUREWORD_SPP := 0;
    GOTO CHECK_LAST;

FEATUREWORD_SPP := FEATURES_SPP[<WORDNUM_OS>];   %FEATURES_SPP: Array of feature word
                                                  %bit masks supported by SPP. This
                                                  % is hardcoded data.

IF (FEATUREWORD_SPP NEQ <FEATUREWORD_OS>) THEN % Compare bits [47:46]
    IF a feature required by SPP is not supported by OS THEN
        RESULT_SPP := FEATUREWORD_SPP & 1 [0:1]; % Set error bit in result
        GOTO RETURN;
    % SUPPORTEDFEATURES_SPP: Array of supported features bit masks.
    SUPPORTEDFEATURES_SPP[<WORDNUM_OS>]   := FEATUREWORD_SPP AND <FEATUREWORD_OS>;
ELSE
    SUPPORTEDFEATURES_SPP[<WORDNUM_OS>]   := FEATUREWORD_SPP;

| Fig. 4A |
|---------|
| Fig. 4B |

Figure 4

```
CHECK_LAST:
        IF Bit0 of <FEATUREWORD_OS> set AND did not receive all expected feature words THEN
            IF any of the remaining features are required by the SPP THEN
                RESULT_SPP := FEATUREWORD_SPP & 1 [0:1];    % Set error bit in result
                GOTO RETURN;
            ELSE
                % Set remaining words in SUPPORTEDFEATURES_SPP array to zero;
            ELSE
                RESULT_SPP := FEATUREWORD_SPP & 0 [0:1];    % Non-error Result (reset error bit)

RETURN:
        RETURN (RESULT_SPP);

[OS]    IF bit0 of SPPFEATURES_OS is set THEN
            %Fatal error. Abort system initialization. Report feature mismatch to
            %operations, etc. System Stopped.

IF (FEATUREWORD_OS NEQ SPPFEATURES_OS) THEN
            IF a feature required by OS is not supported by SPP THEN
                % Fatal error. Abort system initialization. Report feature mismatch to
                % operations, etc. System Stopped.
            ELSE
                % SUPPORTEDFEATURES_OS: Array of supported features bit masks.
                SUPPORTEDFEATURES_OS[WORDNUM_OS]   := FEATUREWORD_OS AND SPPFEATURES_OS;
            ELSE
                SUPPORTEDFEATURES_OS[WORDNUM_OS]   := FEATUREWORD_OS;

IF more feature words to exchange THEN
        BEGIN
            WORDNUM_OS := WORDNUM_OS + 1;
            GOTO LOOP;
            END;
```

| Fig. 4A |
| Fig. 4B |

*Figure 4*

METHOD AND APPARATUS FOR SOFTWARE FEATURES SYNCHRONIZATION BETWEEN SOFTWARE SYSTEMS

BACKGROUND OF THE INVENTION

1. Field of the Invention

The invention relates to software systems particularly with respect to coordination of software feature installation in separate software systems.

2. Description of the Prior Art

Computer systems normally include plural separate software systems exemplified by the System Software (including the Operating System (OS), System Libraries and Utility programs), Application software (including OEM as well as user), and for some Medium to Large Scale systems, Special Purpose Processor (SPP) microcode. An example of an SPP would be the Task Control Unit (TCU) and I/O Unit (IOU) which are part of the I/O Module (IOM) on some of the A-Series and ClearPath systems manufactured by Unisys Corporation of Blue Bell, Pa. (e.g. A18, NX4800).

The IOU is a logical component of the IOM responsible for managing I/O requests sent by OS software. The TCU is the logical component of the IOM responsible for managing task switching and events. In such computer systems there is generally a problem with respect to the release and/or installation of such software systems (e.g., OS software and SPP microcode).

The IOU is a logical component of the IOM responsible for managing I/O requests sent by OS software. The TCU is the logical component of the IOM responsible for managing task switching events. In such computer systems there is generally a problem with respect to the release and/or installation of such software systems (e.g., OS software and SPP microcode).

Normally, the release and/or installation of OS software and SPP microcode can occur independently. If, however, one or more newly added system features require OS software and SPP microcode functionality, problems arise in the coordination of release and installation of the separate software systems. The coordination effort is further complicated when the release and installation procedures differ.

With respect to release problems, it is more often than not, that OS software development and SPP microcode development are performed by different engineering groups. These groups develop release procedures, release identification methods, release media, project schedules and the like, that best satisfy their requirements. Because of the inherent differences between the development of high-level OS software compared to SPP specific microcode, the release mechanisms are seldom the same.

Whenever a new system feature is introduced requiring new releases from both the OS software and the SPP microcode, the following constraints must be considered.

1. The release dates for both the OS software and SPP microcode must be the same. Since software and microcode are independently developed, no advantage is achieved by the early completion of either the OS software or the SPP microcode.
2. The release of additional new features that are unique to either the OS software or SPP microcode must be delayed until both releases are ready.
3. The release of problem fixes that are unique to either the OS software or SPP microcode are delayed until both releases are ready.
4. Regression testing is delayed until both releases are ready.
5. Individual release documentation is complicated by the addition of release interdependency descriptions.

With respect to installation problems, it is not unusual for OS software and SPP microcode installation procedures to differ. Systems often allow OS software and SPP microcode to be independently installed. System interruptions are minimized if only one or the other requires a new support release to be installed. Whenever a new system feature is introduced and that feature requires new releases from both the OS software and SPP microcode, the following installation constraints must be considered.

1. If release interdependencies are not properly documented or are misinterpreted by those responsible for the installation, the wrong release levels may be installed or interdependent releases may be omitted. This may result in longer system interruptions and potentially require that a previously installed release be backed out until the interdependent release is obtained.
2. Even though an installation completes successfully, if an interdependent release was omitted, it may not be immediately detected. The system will resume normal operations until the new system feature is invoked.
3. Release and installation of OS software and SPP microcode must be coordinated whenever one or more mutually supported system features are added.

Although the above problems were described in terms of OS software and SPP microcode, it is appreciated that these problems arise in any system that includes a plurality of separate software entities required to support a particular new feature. Similarly, the below-described invention, that solves the problems, although explained in its best mode embodiments with specific software entities, it is appreciated that the invention is applicable to any plurality of software entities required to support a system feature. Specifically, the invention will be described in terms of OS software and SPP microcode such as a TCU for an IOM. In the Unisys Corporation A-Series computer systems the OS is referred to as a Master Control Program (MCP). The invention may also be applied to the MCP and an IOU for the IOM.

Additionally, the invention may be applied between OS software and a System Library, between two user applications or between any independent software entities capable of exchanging data in the manner to be described by its best mode embodiments.

SUMMARY OF THE INVENTION

The invention includes an interface and protocol between first and second software entities of a system (e.g., OS software and SPP microcode) for the exchange of indications of system features requiring mutual support. During the exchange process, each software environment (e.g., OS or SPP) will examine the other environments supported features to determine which features are mutually supported and therefore usable. The interface is preferably utilized during system initialization and prior to use of such features. If a feature is not mutually supported, appropriate action is taken. If the non-supported feature is optional, it will not be enabled. If the feature is required, the system will report the error and/or halt.

The following new enhancements are provided by the mechanism of the present invention.

1. Optional and required system features may be developed and released independently by software development groups such as the OS and SPP development organizations.
2. Support releases, for example, OS or SPP, (which may contain bug fixes) may now include new optional and required feature support without the need to synchronize such releases.
3. Incompatibility resulting from feature content between OS and SPP releases is immediately detected and reported by the OS during initialization.

BRIEF DESCRIPTION OF THE DRAWINGS

FIG. 1 is illustrated in terms of OS and TCU software entities.

FIGS. 2(a) and 2(b) are the MCP procedure declaration for the TCU_EXCHANGE_FEATURES function of FIG. 1 and the parameter definitions thereof, respectively.

FIG. 2(c) illustrates the manner in which the parameters of FIG. 2(b) are set up for the function call via the hardware 14 and 15 shown in FIG. 1.

FIGS. 3(a) and 3(b) comprise a flow chart describing how the interface of the present invention is used in the environment of FIG. 1.

FIG. 4 is a pseudo code description of the feature exchange mechanism of the present invention. The pseudo code description of FIG. 4 functionally corresponds to the flow chart of FIGS. 3(a) and 3(b) but using the more general OS and SPP nomenclature.

DESCRIPTION OF THE PREFERRED EMBODIMENT

Figure 1:
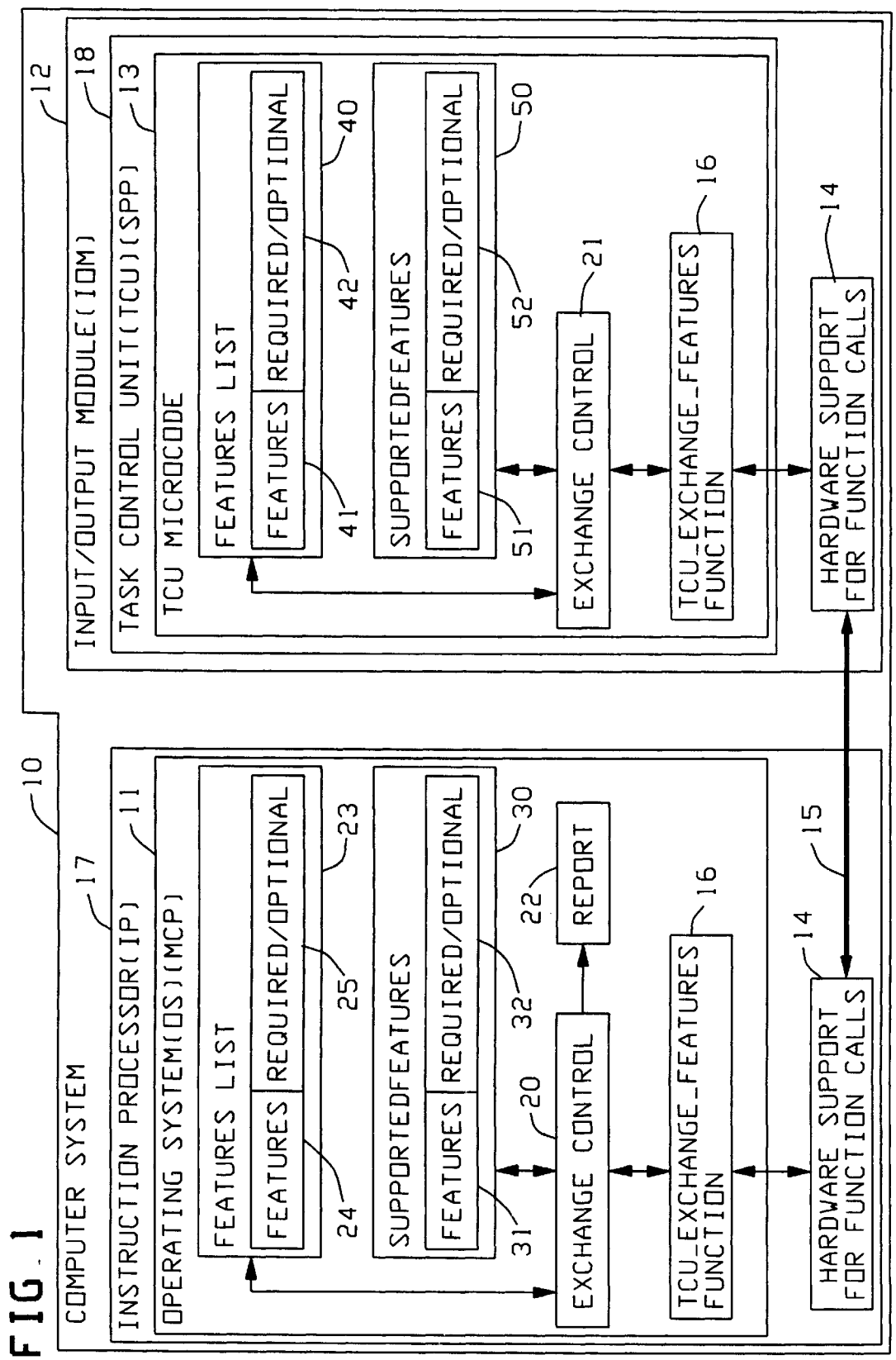
FIG. 1 is a schematic block diagram of a computer system in which the present invention is embodied.

Referring to FIG. 1, a computer system 10 is schematically illustrated embodying the present invention. Specifically, the computer system 10 may utilize a 48 bit word and may be embodied by an A-Series computer system available from Unisys Corporation of Blue Bell, Pa. The computer system 10 includes an Operating System (OS) 11, otherwise denoted as a Master Control Program (MCP) running on one or more Instruction Processors (IPs) 17. The designations OS and MCP will be used herein interchangeably. The computer system 10 further includes an Input/Output Module (IOM) 12 for communicating with peripheral devices in a well-known manner. The IOM 12 includes a Task Control Unit (TCU) 18 which is responsible for managing task switching and events. The TCU 18 is a Special Purpose Processor (SPP) controlled by TCU microcode 13. Throughout the description herein, the designations TCU and SPP will be used interchangeably and will denote hardware or microcode or both in accordance with the context.

The IP 17 and IOM 12 provide hardware support 14 for function calls over a bidirectional interface 15. This interface is hardware dependent having the following minimal requirements. The interface 14 and 15 between the OS and SPP provides a path which permits the OS to pass data to the SPP and synchronously receive result data generated by the SPP. Further, this interface allows repeated uses of the function call. Numerous types of data exchange mechanisms suitable for use by the present invention are included in numerous types of computer systems, as is well known in the art.

While it is not necessary for this interface to be synchronous for all implementations, to do so allows the interface to be implemented as a function call. The minimum requirements for this interface is to provide a path and mechanism between the OS and SPP to exchange data.

In accordance with the invention, MCP 11 and TCU microcode 13 include a TCU_EXCHANGE_FEATURES function 16 providing an exchange protocol between MCP and TCU microcode that facilitates phasing in features that depend on particular MCP and TCU microcode functionality. The form of the communication path between the OS and SPP (MCP 11 and TCU microcode 13) is a function call by the OS utilizing Hardware Support For Function Calls 14 in a manner to be described. When the OS 11 calls this function, the SPP microcode 13 is notified and obtains the data represented by the parameters via the interface 14. The SPP microcode 13 processes the data and provides the result data for the call. A prototype and further details of the function 16 will be described below.

The OS 11 and SPP microcode 13 include respective exchange control portions 20 and 21 for controlling the exchange of feature information in a manner to be described in further detail. The OS 11 also includes a report portion 22 that receives the result of the exchange of feature information.

The OS 11 includes a FEATURES list 23 that comprises a list of feature word bit masks supported by the OS. This is hardcoded data. The FEATURES list 23 includes features bit masks 24 which will be further described below. A required/optional indication 25 is included indicating if a feature is a required feature or an optional feature.

In a similar manner, the OS 11 includes a SUPPORTEDFEATURES list 30 of supported features bit masks representing the features that are mutually supported by the OS 11 and SPP microcode 13. SUPPORTEDFEATURES list 30 includes features bit masks 31 with a required/optional indication 32 indicating if each supported feature is required or optional.

The SPP microcode 13 includes a FEATURES list 40 which is a list of feature word bit masks supported by SPP microcode 13. This is hardcoded data. Accordingly, the FEATURES list 40 includes features bit masks 41 with required/optional indicators 42.

The SPP microcode 13 includes a SUPPORTEDFEATURES list 50 which is a list of supported features bit masks providing indications of features mutually supported by OS 11 and SPP microcode 13. Accordingly, the SUPPORTEDFEATURES list 50 includes features bit masks 51 as well as the required/optional indicators 52.

Although elements 23, 30, 40 and 50 are described as lists, it is appreciated that any suitable data structure may be utilized, e.g., an array or a set of defines. The term list is used in the claims to denote any such suitable data structure.

The features are defined as follows.

Features provided and used by both the OS and SPP microcode environments have one or more of the following characteristics.

1. The feature may be designed as a client/server interface such that one environment provides a service used by the other environment. The determination of whether the feature is required or optional is made with respect to the client environment. That is, if the client can operate without the service (feature) provided by the server, then the feature can be made optional. Otherwise the feature is required.
2. The feature may be designed such that the format of an existing data structure which is shared between the two environments is modified when the feature is enabled. If both environments can operate using either the old or new formats, the feature may be defined as optional. Otherwise the feature is required.

3. The feature is designed such that when enabled, both environments do not interact to support it. If the feature can be designed such that an alternate mode of operation is used if the feature is not available in both environments, then it may be defined as optional. Otherwise the feature is required.

An example of a required feature is as follows. The SPP is modified such that a particular class of function calls requires the data to be accompanied with additional control information. The modification is such that the SPP hardware automatically "consumes" the control data making the data's existence a requirement for all such function calls by the OS. The OS and SPP microcode would add this as a required feature. If this new SPP were installed in a computer system without updating the OS (i.e., the OS would not have the new feature defined), the function calls by the OS to the SPP would not contain the necessary control data. The possible combinations of OS software and SPP microcode and resulting actions are as follows.

1. If the OS software version does not recognize the new feature and the SPP hardware/microcode comprises the old hardware and microcode wherein the feature is not defined, both OS and SPP behave as before.
2. If the OS software version does not recognize the new feature but the SPP hardware/microcode has been upgraded to the new hardware and microcode wherein the feature is defined, then after exchanging features, the new feature is not recognized by the OS and therefore ignored. The SPP, however, returns an error because the feature requires cooperation by the OS.
3. If the OS software version has been upgraded to recognize the new feature where the function calls in the particular class will contain additional control data but the SPP hardware/microcode is the old hardware and microcode wherein the feature is not defined, then after exchanging features, the new feature is not recognized by the SPP and therefore ignored. The OS, however, returns an error because the feature requires cooperation by the SPP.
4. If the OS software version has been upgraded to recognize the new feature where the function calls in the particular class will contain additional control data and the SPP hardware/microcode has been upgraded to the new hardware and microcode where the feature is defined, then after exchanging features, the new feature is recognized by both the SPP and OS and therefore used.

An example of an optional feature is as follows. The SPP microcode is modified to provide a new function call that returns statistics relative to performance. This feature falls under the client/server model. The OS determines that the statistical information provided by the new function call is useful but not critical and therefore dictates that the feature will be considered optional. The OS is modified to recognize the new feature and if present will periodically perform the function call (if available) to gather and report the performance statistics. Older versions of the SPP microcode would not report this feature. The possible combinations of OS software and SPP microcode and resulting actions are as follows.

1. If the OS software version does not recognize the new feature and the SPP hardware/microcode has the old microcode in which the feature is not defined, both the OS and SPP behave as before.
2. If the OS software version does not recognize the new feature but the SPP hardware/microcode has been upgraded to the new microcode wherein the feature is defined, then after exchanging features, the new feature is not recognized by the OS and therefore ignored. The SPP sees that the OS does not use (i.e., recognize) the new feature. No error is returned by the SPP since the SPP plays the server role in this case. That is, whether or not the function is used does not matter to the SPP.
3. If the OS software version has been upgraded to recognize the new feature but the SPP hardware/microcode includes the old microcode wherein the feature is not defined, then after exchanging features, the new feature is not recognized by the SPP and therefore ignored. The OS sees that the SPP does not support the feature. Since the OS treats this as optional, it will not use the interface to report statistics.
4. If the OS software version is upgraded to recognize the new feature and the SPP hardware/microcode has been upgraded to the new microcode wherein the feature is defined, then after exchanging features, the new feature is recognized by both the SPP and OS. The OS will therefore use the feature to report statistics.

To facilitate the exchange of supported features between the OS and SPP microcode, features are represented in one or more bit masks. Each bit in the mask represents a unique feature. If the bit is on (i.e., =1), then the feature is either supported (i.e., provided by the environment) or in the client/server case, supported (server) or used (client). If the bit is off (i.e., =0), then the feature is not supported or used.

The following rules are utilized for assigning a new feature which requires both OS and SPP development.

1. The feature is assigned a unique number. Features are numbered sequentially starting with one.
2. The feature is determined to be either required or optional. If the feature is optional, then an alternate mode of operation is developed along with the feature's mode of operation such that the system will function in the alternate mode when the feature is not mutually supported.
3. When the feature is developed, its number and required/optional information is embedded in the software and/or microcode for use during the exchange process.

During the exchange process, one or more bit masks are exchanged. The width of the bit mask is system dependent but should be as wide as a standard system "word" minus one bit (Bit0 is reserved as a flag for indicating when the last mask word has been exchanged). For example, for system words which are 8 bits wide, 7 features can be represented per mask word. Feature 1 is represented by bit1 of Word1 feature2 by bit2 and so forth.

If the number of features exceeds a system word, multiple words are used. The feature number (Feature#) can be expressed in terms of the mask word number (Word#) and bit number in the mask word (Bit#). Feature and word numbers start at 1. The relationship between these numbers can be expressed as follows, where B=BITS_PER_SYSTEM_WORD and Bit# ranges from 1 to (B−1).

Feature#=(Bit#+((B−1)×(Word#−1))).

The following equations provide the bit and word numbers in terms of the feature number.

Word#=(Feature#+(B−1)−1) DIV (B−1).
Bit#=Feature#−((B−1)×(Word#−1)).

For example, for systems with 8 bit words, feature number 22 is represented in Word4, Bit1:

Word#=(22+8−1−1) DIV (8−1)=(28/7)=4.
Bit#=22−((8−1)×(4−1))=22−(7×3)=1.

It is appreciated that the same procedure is utilized for determining word and bit numbers for systems with the 48 bit words indicated above with respect to FIG. 1.

The Hardware Support For Function Calls 14 is he interface preferably utilized by the exchange function TCU_EXCHANGE_FEATURES 16 for exchanging feature information between the MCP 11 and the TCU microcode 13.

Referring to FIGS. 2(a)–2(c), with continued reference to FIG. 1, FIG. 2(a) sets forth the MCP procedure declaration for TCU_EXCHANGE_FEATURES function while FIG. 2(b) defines the parameters thereof. TCU_EXCHANGE_FEATURES is an MCP procedure which uses the Hardware Support For Function Calls 14 interface and provides an interface between the MCP and TCU microcode for exchanging a bit mapped list of supported features.

The parameter WORDNUM is defined as the word number of MCP-understood or MCP-supported features indicated in MCPTCUFEATURES. The MCP 11 passes the Word# in this parameter, each Word# passing 47 feature bits.

With respect to MCPTCUFEATURES, each of bits 1 . . . 47 in this word corresponds to a particular feature supported by the MCP 11 or TCU microcode 13. The MCP 11 sets a feature bit to 1 if and only if the feature is supported by the MCP 11 or the feature is a TCU microcode feature that the MCP understands.

The parameter LASTCALL is set to TRUE if and only if this is the last call of TCU_EXCHANGE_FEATURES that the MCP will make.

TCU_EXCHANGE_FEATURES utilizes the Hardware Support For Function Calls 14 interface. The parameters passed over this interface are set up as illustrated in FIG. 2(c). TCU_EXCHANGE_FEATURES returns the BOOLEAN value of the Result Word returned by the TCU microcode 13 via the interface.

The first MCP/TCU feature is assigned to the first feature word, bit1. As new features are added, bits are assigned at the next highest available bit of the last MCPTCUFEATURES word. A single call to this interface allows the exchange of 47 unique features. If more than 47 features are defined, multiple calls are made by specifying WORDNUM=2 for features 48–94, WORDNUM=3 for features 95–141 and so forth. Using the equations given above, the feature number is defined by (Bit#+47 (WORDNUM−1)). The last MCPTCUFEATURES word sent specifies LASTCALL=TRUE.

When a feature bit is assigned, it is characterized by both the MCP and TCU microcode as either optional or required. Required features must be supported by both the MCP and TCU microcode. If a required feature is not mutually supported, the MCP will DEADSTOP the system. Optional features need not be supported by both. If an optional feature is not supported by both the MCP and TCU microcode, the feature is not used. For each call to this interface, the TCU microcode returns its corresponding MCPTCUFEATURES word as specified by WORDNUM.

Thus it is appreciated that this MCP to TCU function interface is defined to support feature coordination.

Figure 3A:
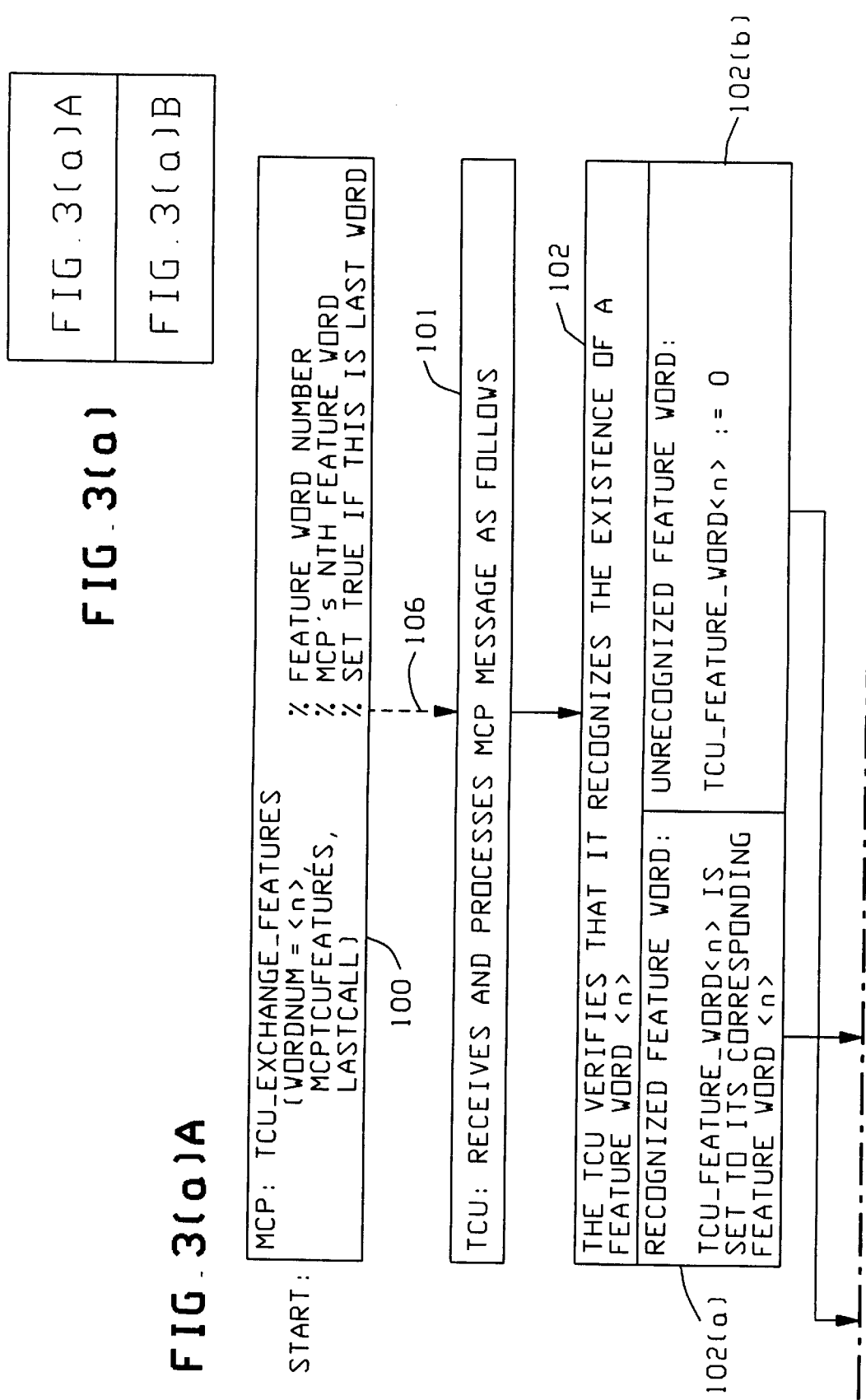

Referring to FIGS. 3(a) and 3(b) with continued reference to the preceding figures, a flow chart is illustrated describing how the TCU_EXCHANGE_FEATURES interface 16 is used during system initialization, IOM reconfiguration and microcode load by both the MCP and TCU microcode. The initial value of <n> is "1". In the flow chart, comments are preceded by "%". Additionally, a data word followed by "&<k>[<b>:1]" is a bit set operation. It sets bit <b>to <k> where k is 0 or 1. The blocks of the flow chart illustrated in FIG. 3(a) are identified by reference numerals 100–104, respectively, and the blocks of the flow chart illustrated in FIG. 3(b) are identified by reference numerals 110–114, respectively. In branching blocks 102–104, 110, 111 and 113, the left hand branch is denoted by the suffix "a" and the right hand branch is denoted by the suffix "b". Blocks 100 and 110–114 describe actions occurring in the MCP environment. Blocks 101–104 describe actions occurring in the TCU environment.

In block 100, the MCP calls the TCU_EXCHANGE_FEATURES interface with the parameters as indicated. The exchange information is transferred to the TCU via the Hardware Support For Function Calls 14 and the path 15 (FIG. 1). The illustrated set up of parameters was discussed above with respect to FIG. 2. The LASTCALL parameter bit is set in the least significant bit of PARAM2 as indicated. Dotted arrow 106 indicates the MCP to TCU communication path 14 and 15 (FIG. 1).

In block 101 the TCU microcode receives the MCP data which is processed as indicated in the blocks 102–104. In blocks 103b and 104b an ERROR RESULT may be bit set as indicated, or in block 104a a NORMAL RESULT may be bit set as indicated. The RESULT word TCU_FEATURE_WORD<N>is returned to MCP as indicated by dotted arrow 107 at the bottom of FIG. 3(a) and the top of FIG. 3(b). The TCU to MCP communication is effected along communication path 15 (FIG. 1).

With continued reference to FIG. 3(b), in blocks 110 and 111 the MCP either verifies that all of its required features are supported by the TCU microcode or detects unsupported features and deadstops the system. In block 112, a global feature list is established and in blocks 113 and 114, preparation is made for additional calls or termination of the process. Block 114 returns to block 100 of FIG. 3(a) utilizing the label START.

The specific descriptions with respect to FIGS. 1–3 above were provided with respect to the specific MCP and TCU environments. A more generic description of the invention is now provided in terms of the OS and SPP environments. The following is a prototype of the generic function.

PROTOTYPE OF GENERIC FUNCTION
BITMASK PROCEDURE EXCHANGE_FEATURES (WORDNUMBER, FEATUREWORD);
INTEGER WORDNUMBER;
BITMASK FEATUREWORD;
 WORDNUMBER
  This is the number associated with FEATUREWORD. If the number of features to be exchanged cannot be represented by the number of bits in FEATUREWORD, multiple words are exchanged and WORDNUMBER identifies which word is being exchanges for a given function call.
 FEATUREWORD
  This is a bit mask of features supported by the OS. If a bit is on, the corresponding feature is supported by the OS. If the bit is off, the feature is not supported by the OS. FEATUREWORD is formatted into Bit0 and Bits(1-n), where Bit0 is the least significant bit. Bit0 set to 1 indicates that this is the last FEATUREWORD and therefore the last function call. With respect to Bits(1-n), a bit set to 1 represents a feature that is supported by the OS. Each feature developed between the OS and SPP is assigned a feature word and bit. The feature should also be characterized as optional or required. Feature definition should be hardcoded in both the OS and SPP environments.
 RESULT
  The RESULT returned by the SPP is its corresponding feature bit mask. That is, if the function call is for the first feature word, (i.e., WORDNUMBER=1) then the SPP returns irs first feature bit mask. A "1" in Bit0 indicates an error.

Referring to FIG. 4, a pseudo code description of the feature exchange mechanism using the EXCHANGE_FEATURES function is illustrated. This mechanism would be invoked during system initialization prior to use of any of the defined features. The following conventions are used in FIG. 4.

1. Labels are shown in bold characters.
2. The described activity is either occurring in the OS environment or in the SPP environment. The environment is indicated by use of [OS] or [SPP].
3. Local variables belonging to the [OS] environment use the suffix "_OS". Similarly, variables in the [SPP] environment use "_SPP".
4. Comments are preceded by "%".
5. NEQ represents Not Equal and is a bitwise comparison operation ignoring Bit0.
6. AND represents a bitwise AND operation or when used in a conditional test, a logical AND operation.
7. A data word followed by "&<k>[<b>:1]" is the above mentioned bit set operation. It sets bit <b>to <k>where k is 0 or 1.

It is appreciated that the functionality of FIG. 4 closely tracks that of FIGS. 3(a) and 3(b). The LOOP section of FIG. 4 corresponds to blocks 100–103 of FIG. 3(a). The CHECK_LAST section of FIG. 4 corresponds to block 104 of FIG. 3(a). The RETURN section of FIG. 4 corresponds to FIG. 3(b). The feature list is implemented as the array FEATURES_OS in the MCP and FEATURES_SPP in the SPP.

After performing the operations, the OS has either faulted due to a feature mismatch or has completed the exchange of all feature words. If a fault did not occur, both the OS and SPP have identical records of which features are mutually supported in their respective arrays. If an optional feature is not supported, it will not be used and an alternative mode of operation may be effected.

It is appreciated with respect to FIGS. 1 and 4 that the FEATURES_OS array is an implementation of the FEATURES list 23 and the hardcoded bit masks are stored at 24. The SUPPORTEDFEATURES_OS array is an implementation of the SUPPORTEDFEATURES list 30 with the bit masks stored at 31. The FEATURES_SPP array is an implementation of the FEATURES list 40 with the hardcoded bit masks stored at 41. The SUPPORTEDFEATURES_SPP array is an implementation of the SUPPORTEDFEATURES list 50 with the bit masks stored at 51. The SPPFEATURES_OS is returned as report 22.

Bit masks are utilized to facilitate the comparison operation. The use of bit masks is not, however, a requirement. Other known feature indication storage arrangements, such as any bit map arrangement, could be utilized to the same effect.

Another example of two software entities that may utilize the invention are two independent processes running within the same computer system controlled by the same OS. Any two software processes which are capable of using an InterProcess Communication (IPC) mechanism to implement interface 14–15 may use this invention.

The above described embodiment was explained in terms of mutually supported features. However, features which are not mutually supported could be included for reporting purposes. That is, the OS could obtain and report on SPP features which the OS does not need to support. These features would be considered optional.

Each of, or at least one of, the software entities maintains/constructs a list of features supported by both. The bits representing optional features may be dynamically referenced to determine whether to use the feature or to effect the alternate mode.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. In a computer system including software program entities and having features providing specific functionality, at least one of said features requiring mutual support of at least two of said software program entities, said computer system being subject to introduction of new features, said software program entities being subject to new releases to support said new features, said software program entities including a first and a second software program entity, a feature exchange method comprising:

storing, associated with said first software program entity, first indications of features supported by said first software program entity that require mutual support of said second software program entity, storing, associated with said second software program entity, second indications of features supported by said second software program entity that require mutual support of said first software program entity, comparing said first and said second indications with respect to each other, and taking an appropriate action if said first indications include an indication of a feature not included in said second indications and taking said appropriate action if said second indications include an indication of a feature not included in said first indications, so as to prevent inappropriate operation of said computer system due to installation of a release of one of said first and second software program entities that supports a particular feature requiring mutual support of the other of said first and second software program entities, where a release of said other of said first and second software program entities supporting said particular feature has not been installed, wherein said features include required features and said comparing and taking steps comprise transferring said first indications from said first software program entity to said second software program entity, comparing, by said second software program entity, said first indications with said second indications, transferring said second indications from said second software program entity to said first software program entity, transferring from said second software program entity to said first software program entity, an error indication if said second indications include an indication of a required feature not included in said first indications, comparing, by said first software program entity, said second indications with said first indications, and taking an error action, by said first software program entity, if said first indications include an indication of a required feature not included in said second indications and taking said error action if said first software program entity receives said error indication, wherein said features further include optional features including a particular optional feature and said step of taking an appropriate action comprises the step of taking said appropriate action if said first indications include an indication of said particular optional feature that is not included in said second indications and taking said appropriate action if said second indications include an indication of said particular optional feature that is not included in said first indications, said appropriate action selected from the group consisting of non-enablement of said particular optional feature and enablement of an alternate mode of operation to said particular optional feature.

2. The method of claim 1 wherein said first and second indications comprise bit masks where a bit thereof represents a feature and wherein each said comparing step comprises a bitwise comparison of said bit masks.

3. The method of claim 2 wherein each said bit mask includes a reserved bit for said error indication and wherein said step of transferring said error indication includes setting, by said second software program entity, said reserved bit in a bit mask containing said second indications.

4. The method of claim 2 further comprising including, in said first software program entity, a hardcoded list of said bit masks containing said first indications, and including, in said second software program entity, a hardcoded list of said bit masks containing said second indications.

5. The method of claim 1 wherein said second software program entity comprises a microcoded special purpose processor of said computer system.

6. The method of claim 4 further comprising including in said hardcoded list associated with each said software program entity an indication of said particular optional feature and an indication that said particular optional feature is optional.

7. The method of claim 6 wherein said hardcoded lists include indications that said required features are required.

8. The method of claim 1 wherein said first software program entity comprises an operating system of said computer system.

9. The method of claim 4 wherein each said hardcoded list comprises a plurality of said bit masks each said bit mask being identified by a word number and wherein said step of transferring said first indications comprises transferring, from said first software program entity to said second software program entity, a particular bit mask with a predetermined word number from said list associated with said first software program entity, and said step of transferring said second indications comprises transferring, from said second software program entity to said first software program entity, a bit mask corresponding to said particular bit mask having said predetermined word number from said list associated with said second software program entity.

10. The method of claim 9 wherein a new required feature is introduced in said first or second software program entity and wherein said method further includes setting a bit in an associated bit mask corresponding to said new required feature.

11. The method of claim 4 further including maintaining, by at least one of said first and second software program entities, a list of indications of features supported by both said first and second software program entities.

12. In a computer system including software program entities and having features providing specific functionality, at least one of said features requiring mutual support of at least two of said software program entities, said computer system being subject to introduction of new features, said software program entities being subject to new releases to support said new features, said software program entities including a first and a second software program entity, feature exchange apparatus comprising:

means for storing, associated with said first software program entity, first indications of features supported by said first software program entity that require mutual support of said second software program entity, means for storing, associated with said second software program entity, second indications of features supported by said second software program entity that require mutual support of said first software program entity, means for comparing said first and said second indications with respect to each other, and means for taking an appropriate action if said first indications include an indication of a feature not included in said second indications and for taking said appropriate action if said second indications include an indication of a feature not included in said first indications, so as to prevent inappropriate operation of said computer system due to installation of a release of one of said first and second software program entities that supports a particular feature requiring mutual support of the other of said first and second software program entities, where a release of said other of said first and second software program entities supporting said particular feature has not been installed, wherein said features included required features and said comparing and taking means comprise means for transferring said first indications from said first software program entity to said second software program entity, means for comparing, by said second software program entity, said first indications with said second indications, means for transferring said second indications from said second software program entity to said first software program entity, means for transferring, from said second software program entity to said first software program entity, an error indication if said second indications include an indication of a required feature not included in said first indications, and means for comparing, by said first software program entity, said second indications with said first indications, said first software program entity taking an error action if said first indications include an indication of a required feature not included in said second indications, said first software program entity also taking said error action if said first software program entity receives said error indication, wherein said features further include optional features including a particular optional feature, and said means for taking an appropriate action comprises means for taking said appropriate action if said first indications include an indication of said particular optional feature that is not included in said second indications and for taking said appropriate action if said second indications include an indication of said particular optional feature that is not included in said first indications, said appropriate action selected from the group consisting of non-enablement of said particular optional feature and enablement of an alternate mode of operation to said particular optional feature.

13. The apparatus of claim 12 wherein said first and second indications comprise bit masks where a bit thereof represents a feature, and each said comparing means is operative to perform a bitwise comparison of said bit masks.

14. The apparatus of claim 13 wherein each said bit mask includes a reserved bit for said error indication, said means for transferring said error indication includes means for setting, by said second software program entity, said reserved bit in a bit mask containing said second indications.

15. The apparatus of claim 13 further comprising a hardcoded list, included in said first software program entity, of said bit masks containing said first indications, and a hardcoded list, included in said second software program entity, of said bit masks containing said second indications.

16. The apparatus of claim 12 wherein said second software program entity comprises a microcoded special purpose processor of said computer system.

17. The apparatus of claim 15 wherein said hardcoded list associated with each said software program entity includes an indication of said optional feature and an indication that said optional feature is optional.

18. The apparatus of claim 17 wherein said hardcoded list include indications that said required features are required.

19. The apparatus of claim 12 wherein said first software program entity comprises an operating system of said computer system.

20. The apparatus of claim 15 wherein each said hardcoded list comprises a plurality of said bit masks, each said bit mask being identified by a word number, said means for transferring said first indications being operative for transferring, from said first software program entity to said second software program entity, a particular bit mask with a predetermined word number from said list associated with said first software program entity, said means for transferring said second indications being operative for transferring, from said second software program entity to said first software program entity, a bit mask corresponding to said particular bit mask having said predetermined word number from said list associated with said second software program entity.

21. The apparatus of claim 20 wherein a new required feature is introduced in one of said first or second software program entities, said one software program entity being operative for setting a bit in an associated bit mask corresponding to said new required feature.

22. The apparatus of claim 15 further including a list of indications of features supported by both said first and second software program entities maintained by at least one of said first and second software program entities.

23. The apparatus of claim 12 wherein said first and second indications comprise feature indication storage arrangements.

24. The apparatus of claim 23 wherein said feature indication storage arrangements comprise bit masks where a bit thereof represents a feature, and each said comparing means is operative to perform a bitwise comparison of said bit masks.

* * * * *